United States Patent [19]
Logsdon

[11] 3,973,590
[45] Aug. 10, 1976

[54] MIXING VALVE FOR AIR DISTRIBUTING SYSTEMS

[75] Inventor: Hillard Glenn Logsdon, Charlotte, N.C.

[73] Assignee: Aeronca, Inc., Pineville, N.C.

[22] Filed: Feb. 1, 1974

[21] Appl. No.: 438,570

[52] U.S. Cl. ............................... 137/601; 98/38 B; 137/607
[51] Int. Cl.² ......................................... F16K 19/00
[58] Field of Search .......... 98/38, 38 A, 38 B, 38 E, 98/40 C, 40 V, 40 VM, 40 VT, 41 R, 107, 110; 137/601, 607; 236/13

[56] References Cited
UNITED STATES PATENTS

| | | | |
|---|---|---|---|
| 1,075,197 | 10/1913 | Cramer | 236/13 X |
| 1,359,558 | 11/1920 | Wine | 98/107 X |
| 1,424,410 | 8/1922 | Hopewell | 98/107 X |
| 2,255,735 | 9/1941 | McGrath | 98/38 X |
| 2,331,476 | 10/1943 | Jones | 236/13 X |
| 2,349,544 | 5/1944 | Fiedler | 98/40 V |
| 2,891,576 | 6/1959 | Kennedy | 137/601 X |
| 3,123,098 | 3/1964 | Bishop | 137/601 |
| 3,363,534 | 1/1968 | Spradling | 98/38 |

Primary Examiner—Robert G. Nilson
Attorney, Agent, or Firm—Bell, Seltzer, Park & Gibson

[57] ABSTRACT

A mixing valve for mixing airstreams of different characteristics in an air distributing system, and wherein the mixing valve is provided with first and second groups of louvers so arranged that one group of louvers is moved toward an open position as the other group of louvers is moved toward a closed position and vice versa, and means is responsive to movement of either group of louvers toward and into closed position for exerting an opposing force thereon for aiding in subsequently opening the same against the force of an airstream impinging thereon.

14 Claims, 8 Drawing Figures

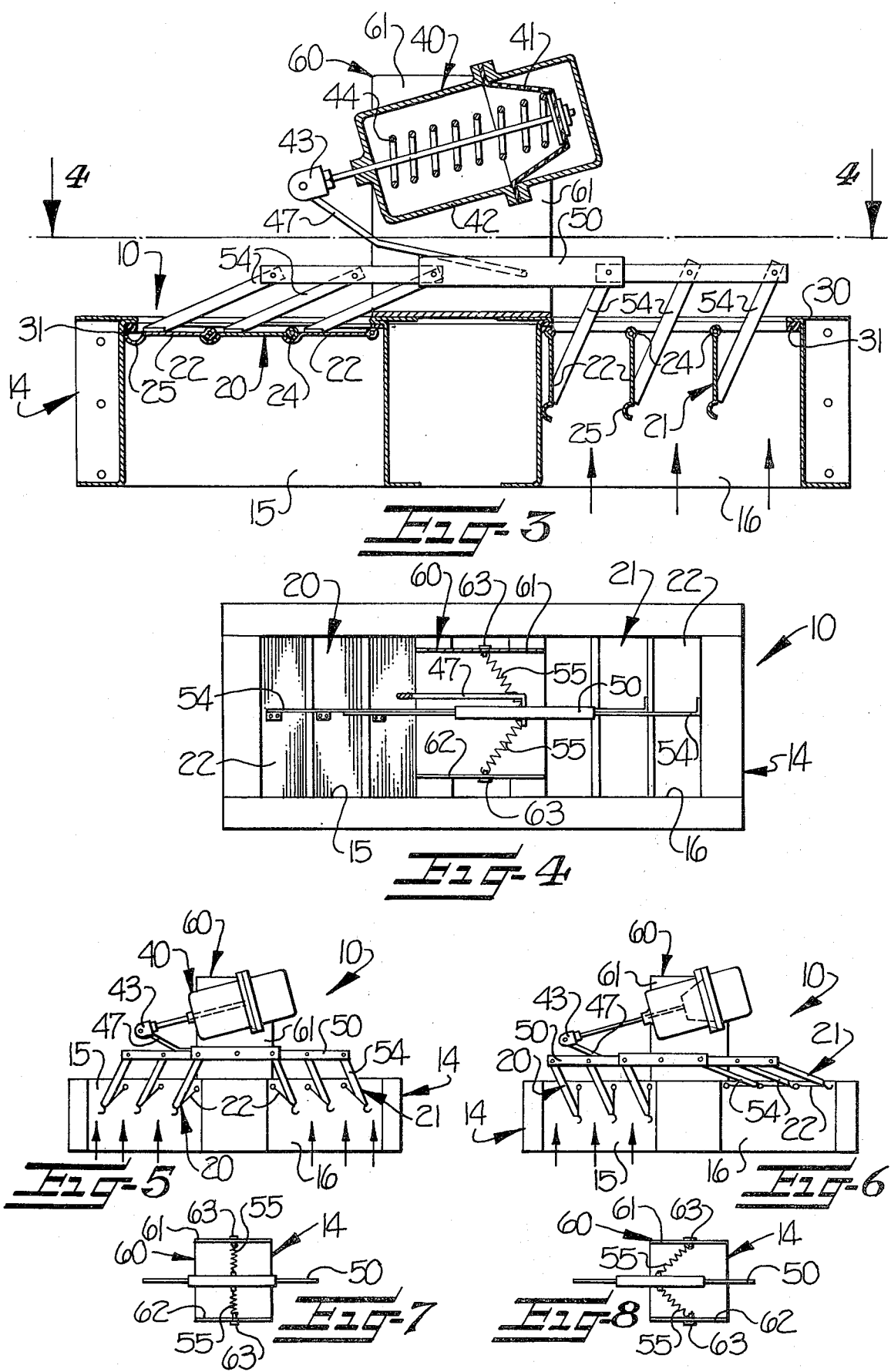

MIXING VALVE FOR AIR DISTRIBUTING SYSTEMS

This invention relates to air distributing systems and, more especially, to an improved mixing valve for effectively mixing airstreams in their course from separate inlets to a common outlet while varying the volume of the airstreams with respect to each other to obtain a composite airstream of the desired predetermined characteristics.

Various forms of air mixing valves have been proposed heretofore for use in air distributing systems but none of such valves have been entirely satisfactory due to one or more of the following reasons: (1) their bulky construction and problems attendant to installing the same; (2) the obtaining of an effective air seal when the flow control valves thereof are moved to closed position; (3) the arrangement of the flow control valves for the respective airstreams has oftentimes resulted in ineffective mixing of the airstreams and thus has necessitated a tortuous flow of airstreams by the use of baffled expansion chambers for furthering the mixture of the airstreams; and (4) the force necessary to open the respective flow control valves against the force of an airstream impinging thereon generaly has required the use of valves whose respective blades or louvers were pivoted at their centers to thereby reduce the size of the prime mover required for opening the valves. However, valves of this type whose respective blades are pivoted at their centers, present problems in providing effective seals when closed for preventing any air flow therethrough.

With the foregoing in mind, it is an object of this invention to provide an improved mixing valve for mixing respective airstreams in an air distributing system, which mixing valve is of compact construction and readily installed within a housing or duct of an air conditioning system, with the respective flow control valves thereof being so arranged as to provide an intimate intermixture of the respective airstreams and with the valves being arranged so as to provide a readily effective seal when the valves are moved to a closed position. Preferably, means are provided for facilitating the opening of the respective flow control valves against the flow of an airstream impinging thereon so as to permit the use of a lower rated prime mover for moving the respective flow control valves toward open position.

It is another object of this invention to provide a mixing valve of the character described in which first and second louver means are so constructed and operated that, when both louver means are open, they direct respective airstreams into converging relation as they emerge from the air passages so as to induce effective intermixing of the airstreams immediately upon their emergence from the mixing valve.

It is a more specific object of this invention to provide an improved air mixing valve for mixing airstreams in an air distributing system, which mixing valve includes frame means defining first and second air passages therethrough in which first and second movable louver means are positioned, and wherein the use of a motive means, exerting a relatively small force for moving the first and second louver means, is facilitated by providing force applying means responsive to movement of either of the louver means toward and into closed position for exerting an opposing force thereon to aid in subsequently moving the respective louver means in the opposite direction against the force of an airstream impinging thereon.

Still another object of the invention is to provide an air mixing valve of the character described in which the force applying means comprises spring means which is in an inactive or substantially relaxed condition with the first and second louver means occupying intermediate positions about halfway between open and closed positions, and wherein the motive means is operable to move one louver means toward an open position while moving the other louver means toward a closed position and vice versa. The spring means is effective to exert a yieldable force on the louver means in a direction opposite from that of movement of either louver means toward and into closed position for aiding in subsequently opening either closed louver means against the force of an airstream impinging thereon.

Some of the objects of the invention having been stated, other objects will appear as the description proceeds when taken in connection with the accompanying drawings, in which FIG. 1 is a perspective view of a preferred embodiment of the improved mixing valve showing the same in exploded relation with respect to adjacent portions of a plenum or housing of an air distributing system;

FIG. 3 is a longitudinal sectional plan view through the mixing valve taken substantially along line 3—3 of FIG. 1;

FIG. 4 is an elevation of the downstream side of the mixing valve, partially in section, looking substantially along line 4—4 in FIG. 3, but being on a reduced scale;

FIGS. 5 and 6 are schematic views similar to FIG. 3 but being shown at a reduced scale and showing the louver blades of the first and second valve means occupying relatively different positions in FIGS. 5 and 6 and also occupying different positions from those in which they are shown in FIG. 3; and FIGS. 7 and 8 are fragmentary schematic views similar to the central portion of FIG. 4 and showing different positions occupied by tension springs and the operating member of the mixing valve when the first and second louver means thereof occupy the respective positions shown in FIGS. 5 and 6.

Figure 1:
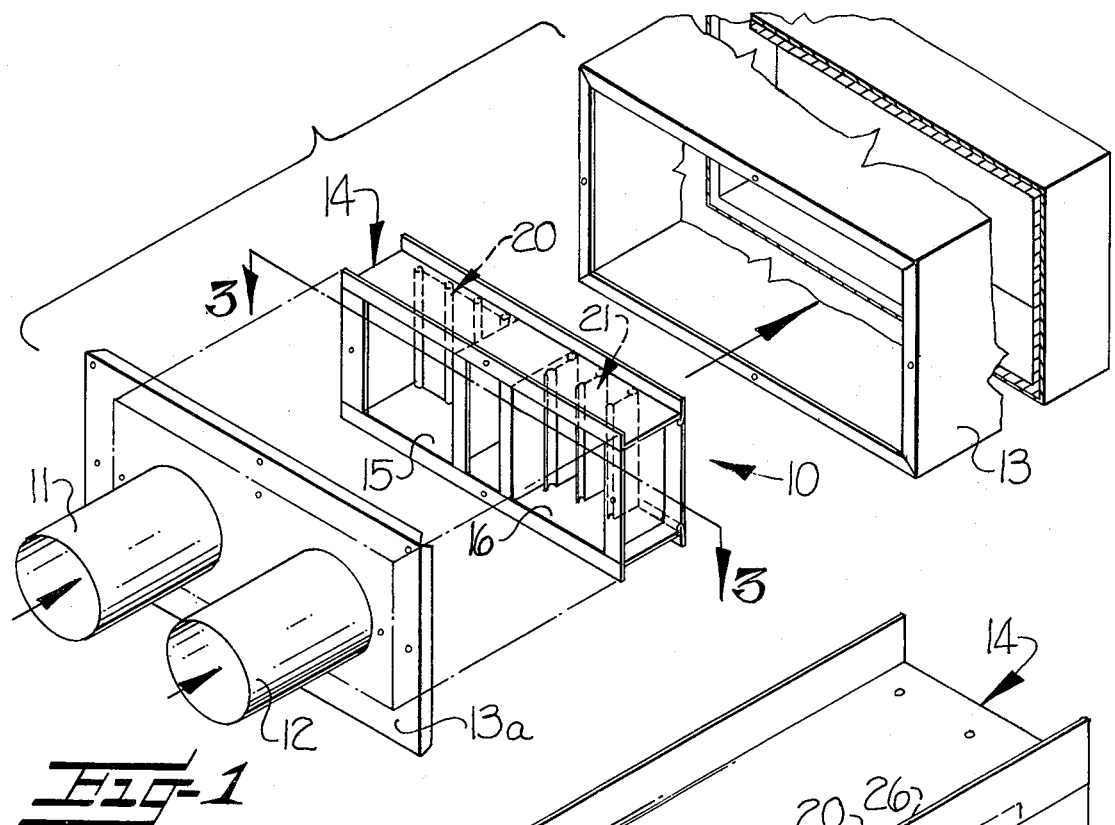

Referring more specifically to the drawings, the improved air mixing valve, broadly designated at 10, is shown in FIG. 1 in association with an air distributing system represented by first and second air inlet conduits 11, 12 and a relatively large outlet duct or housing 13 which, in this instance, serves as an expansion chamber of considerably greater cross-sectional area and volume per unit length thereof than either of the inlet conduits 11, 12.

As shown in FIG. 1, in its preferred embodiment, the air mixing valve 10 is compact and substantially self-contained in that all essential components thereof are mounted on or in a relatively shallow and substantially rectangular frame means 14 embodied in a composite housing somewhat smaller than the interior dimensions of the rear or air inlet end of housing 13 so as to be readily installed in housing 13. The ingress or rear end of frame means 14 is suitably secured to the rear end wall portion 13a of housing 13 so as to support the air mixing valve 10 within and adjacent the rear end of housing 13. The end wall portion 13a is suitably seured to and substantially closes the rear end of housing 13, with the exception of providing communication between the air inlet openings at the downstream ends of conduits 11, 12 and the interior of housing 13.

The frame means 14 is so constructed as to provide first and second substantially side-by-side, relatively short and substantially parallel air passages 15, 16 therethrough which are aligned with the inlets defined by the respective inlet conduits 11, 12. Thus, the respective airstreams flowing along inlet conduits 11, 12 may flow through the respective first and second passages 15, 16 of mixing valve 10 when respective first and second flow control valves or louver means 20, 21 therein occupy partially or fully opened positions. As will be presently described, the first and second louver means 20, 21 are especially constructed, arranged and operated so that the airstreams flowing from inlet conduits 11, 12 through passages 15, 16 of air mixing valve 10 are caused to converge when both louver means 20, 21 are open. Also, the louver means 20, 21 vary the volume of the airstreams with respect to each other. Thus, the airstreams rapidly and intimately mix with each other immediately upon emerging from the downstream ends of the respective air passages 15, 16 and the composite airstream thus formed is permitted to expand in the expansion chamber defined by housing 13 so that the air emerging from the outlet or outlets, not shown, provided in housing 13 is of the desired characteristics.

Generally, as is well known, an air mixing valve is utilized for the mixing of relatively warm and relatively cool airstreams to obtain a composite conditioned airstream of the desired temperature. Accordingly, it may be assumed, for the purpose of this disclosure, that the airstreams flowing along the respective inlet conduits 11, 12 are relatively warm and relatively cool, respectively.

In accordance with the invention, because of the fact that the invention includes forces applying means responsive to movement of either louver means 20, 21 toward and into closed position for exerting an opposing force thereon, it now has become practicable to utilize for the louver means 20, 21, louver blades which are pivotally or hingedly supported along or adjacent the respective longitudinal edges thereof, instead of utilizing blades which, conventionally, are pivoted substantially along or adjacent the respective central longitudinal portions thereof. While the force applying means of this invention may be used with the latter type of blades, it is preferred that the blades are of the type hinged along or adjacent their longitudinal edges, as will be presently described, since the pressure of the airstream impinging against each louver blade occupying a closed position is effective against substantially the entire upstream surface of each such closed blade to aid in maintaining the respective blade in tightly closed position.

On the other hand, when conventional damper blades of the type pivoted along or adjacent the respective longitudinal centers thereof are employed, upon which conventional blades occupying closed position, the force of the airstream thereagainst and distributed over the upstream surface of each such blade, is effective against such upstream surface on both sides of the pivotal axis thereof. Consequently, the force of the airstream urges that portion of the blade on one side of its axis toward closed position while urging that portion of the blade on the opposite side of its axis toward open position, thus substantially negating the effect of the force of the airstream against the blade as an aid to urging such blade to fully closed position. Also, difficulties are presented in providing effective sealing means between the walls of respective air passages and blades of the type which are pivoted adjacent their respective longitudinal centers.

Figure 2:
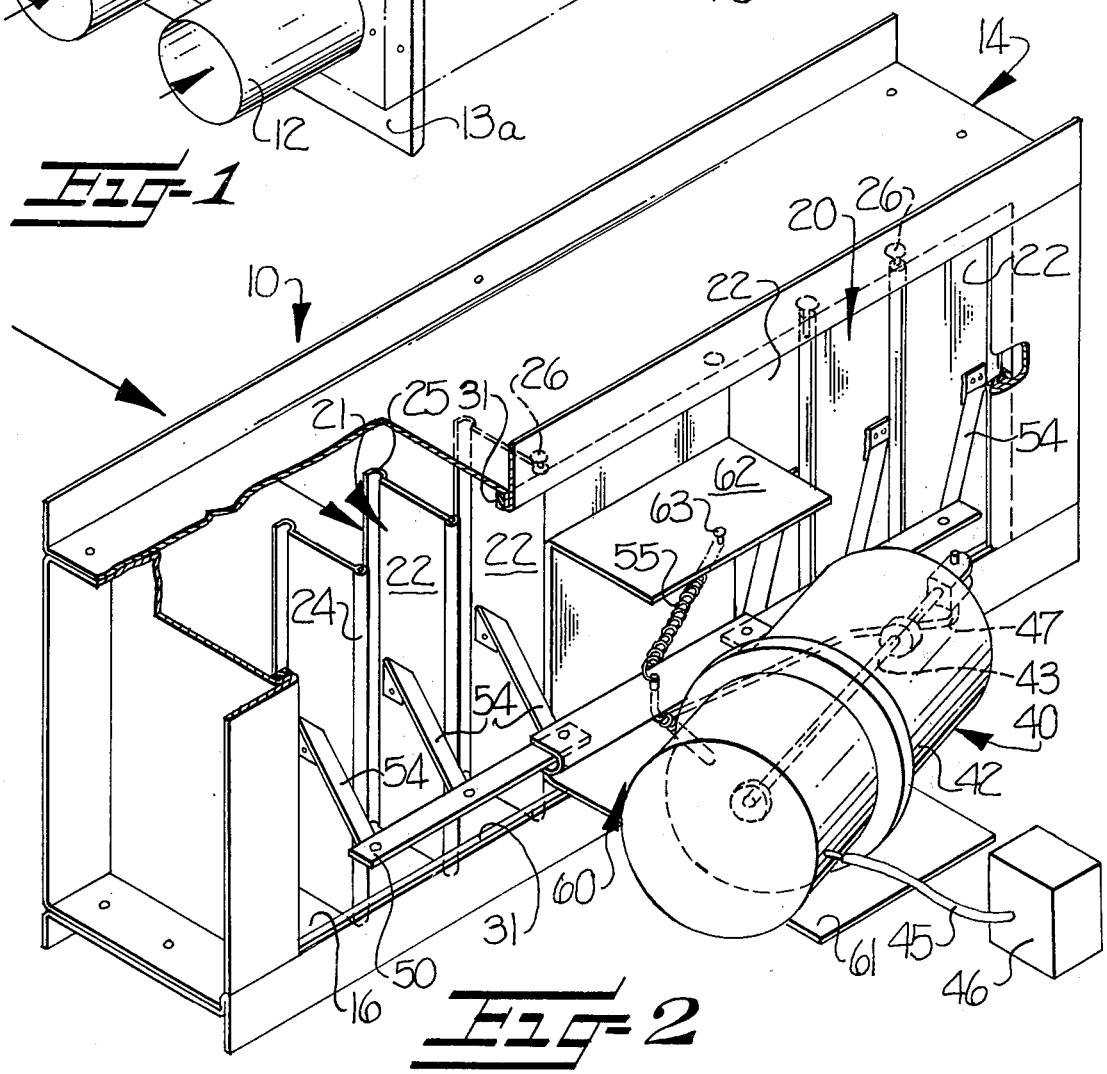
FIG. 2 is an enlarged perspective view of the mixing valve of FIG. 1, looking at the downstream or outlet side thereof opposite from the side thereof shown in FIG. 1.

Therefore, as best illustrated in FIGS. 2, 3 and 4, each of the first and second louver means 20, 21 comprises a plurality or group of substantially rectangular louver blades, each of which is designated at 22 and is hinged or pivoted along or adjacent one longitudinal edge, as will be presently described. By way of example, each louver means 20, 21 is composed of a group of three louver blades 22. Each louver blade 22 preferably is formed of a relatively flat substantially rectangular and substantially rigid sheet metal, or any other suitable sheet material, provided with a hollow, elongate, rounded tubular portion 24 along one longitudinal edge thereof. Each blade 22 also is provided with a substantially U-shaped lip portion 25 extending along the opposite longitudinal edge thereof, which lip portion constitutes the free edge of each louver blade in this instance.

The tubular portion 24 of louver blades 22 extend between opposite side walls of the respective passages 15, 16 defined by frame means 14. Opposite ends of the tubular portions 24 of blades 22 are suitably pivotally mounted on the corresponding opposite side walls of passages 15, 16, as by means of pivot pins 26 (FIG. 2). As shown, and as is preferred, the pivotally mounted tubular portions 24 of all of the louver blades 22 of both the first and second louver means 20, 21 are positioned in a row in spaced substantially parallel relation to each other closely adjacent the egress or downstream ends of the passages 15, 16. Also, at the egress or front ends of the substantially rectangular passages 15, 16, the four sidewalls defining the perimeters of the passages 15, 16 are provided with inwardly projecting flange portions 30 (FIG. 3) thereon for receiving against the rear surfaces thereof suitable resilient sealing means or gaskets 31. The gaskets 31 receive end edges of the body portions of the blades 22 in sealing engagement thereagainst whenever any of the blades 22 occupy fully closed position, as in the left-hand portion of FIG. 3.

The free longitudinal edge portion 25 of the outermost blade 22 of each louver means also is in sealing engagement with the corresponding portion of the respective gasket 31 when the latter louver blade 22 occupies a fully closed position. It is preferred that each gasket 31 is formed of an elastomeric sponge-like material, such as natural or artifical sponge rubber, to provide an effective seal against flow or leakage of air between the blades 22 of any closed louver means and the walls of the respective air passage. Such a seal is particularly desirable to avoid a whistling sound which might otherwise be produced by the leakage of pressurized air past a louver means occupying fully closed position.

A motive means is operatively connected to the first and second louver means 20, 21 in a novel manner for moving the first and second louver means 20, 21 relative to the egress openings of passages 15, 16 so that one louver means is moved toward an open position as the other louver means is moved toward a closed position, and vice versa. The most common means of automatic operation of the louver associated with an air distributing system is by the use of so-called pneumatic operators. Accordingly, by way of example, there will be observed in FIGS. 2 and 3 a motive means 40 embodied in a pneumatic operator utilizing a diaphragm 41 within a motor housing or cylinder 42, and which diaphragm moves in response to air pressure or vacuum to impart linear or longitudinal movements to a plunger 43 projecting from one end of motor housing 42.

The plunger 43 may be moved in one direction by a compression spring 44 and it may be moved in the opposite direction by fluid pressure entering cylinder 42 through a conduit 45 connected to a suitable control device 46 (FIG. 2). Control device 46 may be of any suitable type responsive to varying ambient air conditions, such as temperature variations, in housing 13 or in an adjacent enclosure or room for controlling the flow of fluid pressure into and out of cylinder 42. Motive means 40 may be in the form of an electrically operable motor, or a double-acting fluid operated cylinder or it may take other forms well-known in the art. Accordingly, a further description thereof is deemed unnecessary.

One end of a link 47 is pivotally connected to the outer portion of plunger 43 and the other end of link 47 is pivotally connected to a medial portion of an elongate operating member or connector arm 50 which may be of one-piece construction or, as shown, may be of built-up articulated construction. In any event, operating member 50 preferably should be so constructed or so connected to link 47 as to permit arcuate movement of operating member 50 relative to the stationarily mounted motive means 40 in the course of longitudinal movement of operating member 50.

Operating member 50 is common to and positioned outwardly and downstream of the egress ends or front openings of both of the first and second air passages 15, 16 in frame means 14. Thus, operating member 50 is positioned to extend across and outwardly of the pivotal axes of the groups of louver blades 22 of both the first and second louver means 20, 21. A connector bar 54 is suitably secured or fixed to a central portion of each blade 22 adjacent the free longitudinal edge thereof, and the outer portion of each bar 54 is pivotally connected to operating member 50.

Thus, it will be observed, by a comparison of FIGS. 2, 3, 5 and 6 that, since a pivotal motion is imparted to each connector bar 54 in the same general direction relative to operating member 50 during longitudinal movement thereof in a given direction, any time that operating member 50 is moved longitudinally in one direction, all of the louver blades 22 are pivoted in the same direction with respect to each other. However, the louver blades 22 of one louver means move toward an open position as the louver blades 22 of the other louver means moved toward a closed position, and vice versa, with respect to the egress ends of the respective passages 15, 16. In other words, whenever louver blades 22 of first louver means 20 are moved toward closed position incidental to left to right movement of operating member 50 in FIGS. 3 and 4, louver blades 22 of second louver means 21 are moved toward open position. Conversely, whenever blades 22 of second louver means 21 are moved toward closed position incidental to right to left movement of operating member 50 in FIGS. 3 and 4, the louver blades 22 of first louver means 20 are moved toward open position substantially as indicated in FIG. 6.

For the purposes of this disclosure, it may be assumed that, during optimum operating conditions, the blades 22 of the respective first and second louver means 20, 21 occupy predetermined intermediate positions about halfway between open and closed positions thereof, as shown in FIG. 5, with operating member 50 then occupying an intermediate or neutral position. With the first and second louver means constructed and operated in the manner disclosed herein, it is to be noted that, since each blade 22 is pivoted or hinged closely adjacent one of its longitudinal edges, when the blades of either louver means occupy the fully closed position as shown in the respective FIGS. 2 and 6, substantially the entire surface of one side of each of such closed louver blades then is subjected to the full force or static pressure of the airstream in the corresponding air passage impinging against the closed louver blades. This aids in effecting a substantially airtight seal between the louver means and the side walls at the egress ends of the respective passages 15 or 16, as the case may be. Also, such seal is further enhanced by the gasket 31 and the relative rigidity of the pivoted rounded tubular portions 24 of the blades 22 and the nesting sealing engagement of the lip portions 25 of certain of the blades along the pivotal axes of and against adjacent tubular portions 24 of adjacent blades 22 when the respective louver means occupy closed position.

However, because of the fact that the airstream is impinging against the blades of any fully closed louver means, it is highly desirable to provide some form of means to aid in subsequently moving the corresponding closed louver means in the opposite direction toward an open position so that the motive means need not necessarily be of relative large size and high power and thus may be relatively small to lend to the economical construction and compact nature of the air mixing valve 10.

Therefore, in accordance with the invention, force applying means is provided in response to movement of either louver means toward and into closed position for exerting an opposing force thereon whicn, in this instance, biases the operating member 50 in the opposite direction from that in which it is being moved for aiding in subsequently moving the respective previously close louver means in the opposite direction against the force of an airstream impinging thereon. In its preferred embodiment, the force applying means comprises as best shown in FIGS. 2, 4, 7 and 8, a pair of tension springs 55 having proximal ends thereof connected to opposite sides of operating member 50, and having their distal ends anchored to the frame means 14 at stationary points.

In this instance, frame means 14 is provided with a generally L-shaped bracket 60 suitably secured to the front or downstream medial portion of frame 14, and to the leg portion 61 of which the housing 42 of motive means 40 is suitably secured. The outer end of bracket 60 remote from leg portion 61 has an outwardly extending projection 62 thereon, and the leg portion 61 and projection 62 are spaced astraddle the medial portion of operating member 50. The distal ends of tension springs 55 are suitably connected, as at 63 (FIGS. 2 and 4), to the leg portion 61 and projection 62 of L-shaped bracket 60. Accordingly, the stationary points 63 to which the distal ends of tension springs 55 are anchored, are so positioned that each of the tension springs 55 extends substantially normal to the elongate operating member 50 when the same occupies the aforementioned neutral position thereof with the first and second louver means 20, 21 operating the intermediate positions as in FIG. 5. Thus, as operating member 50 is being moved longitudinally out of its neutral position in either direction, springs 55 are stretched by operating member 50 to thereby exert opposing force on operating member 50.

In the illustrated and preferred embodiment, it can be seen that the proximal ends of tension springs 55 are connected to operating member 50 about halfway between opposite ends of member 50. Also the springs 55 are substantially aligned with each other when operating member 50 occupies the neutral position of FIG. 7. It is to be understood, however, that other forms of spring means may be used in place of springs 55, the springs 55 may be spaced apart along the length of operating member 50, or any other suitable means may be employed for exerting an opposing force on either louver means 20, 21 when it is moved toward and into closed position for aiding motive means 40 in subsequently opening the closed louver means against the pressure of an airstream impinging thereon in accordance with this invention.

It can thus be seen that force applying means, as embodied in tension springs 55, is responsive to movement of either louver means 20 or 21 from its respective intermediate position toward and into closed position for exerting an opposing force thereon for aiding in subsequently opening the closed louver means against the force of an airstream impinging thereon. It can be appreciated, by reference to FIGS. 4, 7 and 8 that, when operating arm 50 occupies a neutral position with louver means 20, 21 also occuping intermediate positions as in FIG. 5, tension springs 55 are substantially relaxed and extend substantially normal to the longitudinal operating member 50. Thus, upon movement of operating member 50 in either longitudinal direction to the position of FIGS. 3 and 4 or to the position of FIGS. 5 and 8, from the position of FIGS. 5 and 7, it follows that tension springs 50 are extended or stretched to exert an opposing force on operating member 50 and on the louver means, which force increases at a progressively increasing rate in the course of movement of either louver means toward and into closed position.

It is important to note that, in addition to providing a force which will assist the motive means in opening each respective fully closed louver means against the force of an airstream impinging thereon, the opposing force acting on each louver means 20, 21 when it is open only a very small amount aids in stabilizing the respective louver means in just that position, to the extent that it substantially prevents the respective blades 22 from fluttering or vibrating between the slightly open and fully closed positions. This further aids in reducing the sound of the mixing valve and of the airflow therethrough during operation of the air distributing system.

In the drawings and specification, there has been set forth a preferred embodiment of the invention, and although specific terms are employed, they are used in a generic and descriptive sense only and not for purposes of limitation.

That which is claimed is:

1. The improvement in a mixing valve for mixing airstreams in an air distributing system, said mixing valve including means defining first and second air passages therethrough, first and second louver means in the respective first and second passages and motive means operatively connected to said first and second louver means for moving the same so that one louver means is moved toward an open position as the other louver means is moved toward a closed position and vice versa, said improvement comprising means responsive to movement of either louver means toward and into closed position for exerting an opposing force thereon for aiding in subsequently moving the respective louver means in the opposite direction against the force of an airstream impinging thereon.

2. The improvement in a mixing valve for mixing airstreams in an air distributing system, said mixing valve including means defining first and second air passages therethrough, first and second louver means in the respective first and second passages, motive means, and means operatively connecting said motive means to said first and second louver means for moving the same so that one louver means is moved toward an open position as the other louver means is moved toward a closed position and vice versa, said improvement comprising force applying means interposed in said connecting means and being in an inactive state when said first and second louver means occupy predetermined intermediate positions about halfway between open and closed positions thereof, and said force applying means being responsive to movement of either louver means from its respective intermediate position toward and into closed position for exerting an opposing force thereon for aiding in subsequently opening the closed louver means against the force of an airstream impinging thereon.

3. Apparatus according to claim 2, wherein said connecting means comprises a movable operating member interposed between said motive means and said first and second louver means and also occupying an intermediate position when said louver means occupy their intermediate positions, and said force applying means comprising spring means associated with said operating member and being in a substantially relaxed state when said operating member and said louver means occupy said intermediate positions, and said spring means being arranged to exert a force acting on said operating member in a direction toward the intermediate position thereof when said member is moved at least a given distance to either side of its intermediate position.

4. Apparatus according to claim 2, wherein said means defining said air passages comprises a substantially rectangular frame with said first and second passages being in side-by-side relation in said frame, each first and second louver means comprising a plurality of louver blades pivotally mounted on substantially parallel axes in said frame, said connecting means comprising an elongate operating member, a plurality of connecting arms having corresponding end portions pivotally connected to said operating member along its length, and the other end of each connecting arm being secured to a respective one of said louver blades, and said motive means including means for moving said operating member longitudinally for pivoting said louver blades about their axes.

5. The improvement in a mixing valve for mixing airstreams in an air distributing system, said mixing valve including means defining first and second air passages therethrough, first and second louver means in the respective first and second passages, motive means, and means operatively connecting said motive means to said first and second louver means for moving the same so that one louver means is moved toward an open position as the other means is moved toward a closed position and vice versa, said improvement comprising force applying means interposed in said connecting means and being in an inactive state when said first and second louver means occupy predetermined intermediate positions about halfway between open and closed positions thereof, and said force applying means being responsive to movement of either louver means from its respective intermediate position toward and into closed position for exerting an opposing force thereon which increases at a progressively increasing rate in the course of movement of the latter louver means toward and into closed position for aiding in subsequently opening the closed louver means against the force of an airstream impinging thereon.

6. The improvement in a mixing valve for mixing airstreams in an air distributing system, said mixing valve including frame means defining first and second air passages therethrough, first and second louver means mounted in said frame means for pivotal movement in the respective first and second passages, motive means carried by said frame means, and means including an elongate longitudinally movable operating member movable to and fro longitudinally thereof by said motive means and operatively connecting said motive means to said first and second louver means so as to move one louver means toward an open position while moving the other louver means toward a closed position and vice versa, said improvement comprising force applying means operatively connected to said operating member and being in a substantially inactive condition when said first and second louver means occupy predetermined intermediate positions about halfway between open and closed positions thereof with said operating member then occupying a neutral position, and said force applying means being responsive to movement of said operating member causing movement of either louver means from its respective intermediate position toward and into closed position for exerting an opposing force on said operating member for aiding said motive means in subsequently opening the closed louver means against the force of an airstream impinging thereon.

7. Apparatus according to claim 6, wherein said first and second louver means are positioned in side-by-side relation in said frame means and comprise respective groups of louver blades pivotally mounted on substantially parallel axes in said frame means, said operating member being positioned to extend across and outwardly of the axes of said louver blades, a link fixed to each blade and having a portion pivotally connected to said operating member, and said force applying means comprising tension spring means connected to said operating member and being in substantially relaxed condition when said operating member occupies said neutral position, and said tension spring means being arranged to be extended by said operating member whenever it is moved longitudinally at least a given distance either side of the neutral position thereof.

8. Apparatus according to claim 6, wherein said force applying means comprises a pair of tension springs having proximal ends connected to opposite sides of said operating member and having their distal ends anchored to said frame means at stationary points so positioned that each of said tension springs extends substantially normal to said elongate operating member when the same occupies said neutral position with said first and second louver means occupying said intermediate positions so that, as said operating member is being moved longitudinally out of its neutral position in either direction said springs are stretched by said operating member, thereby exerting said opposing force on said member.

9. Apparatus according to claim 6, wherein said first and second louver means comprise respective first and second groups of sustantially rectangular, elongate louver blades pivotally mounted in said frame means on spaced substantially parallel axes adjacent the downstream ends of said first and second air passages, and means connecting said louver blades to said operating arm so that, when both groups of blades are at least partially open, the blades of the respective groups extend at an angle toward each other converging downstream to induce effective intermixing of the airstreams immediately upon their emergence from said first and second air passages.

10. Apparatus according to claim 9, wherein the pivotal axes of said blades extend along and proximal to corresponding longitudinal edges of said blades, each of said blades including a substantially free longitudinal edge portion remote from its respective pivotal axis, and said free edge portions of certain of said louver blades being arranged to engage adjacent blades along the pivotal axes thereof in substantially sealing engagement therewith when the respective louver means occupy said closed position.

11. Apparatus according to claim 10, including resilient sealing means carried by said frame means and positioned in and adjacent the perimeters of said air passages, and said sealing means being arranged for sealing engagement by the respective group of blades whenever either of said groups of blades occupies said closed position.

12. A mixing valve adapted to be positioned in a housing of an air distributing system for mixing airstreams, said mixing valve including frame means defining a composite housing having substantially side-by-side first and second air passages therethrough, first and second groups of louvers pivotally mounted in said composite housing on spaced parallel axes for pivotal movement in the respective first and second passages, motive means mounted on said frame means, means including an elongate longitudinally movable operating member movable to and fro longitudinally thereof by said motive means and operatively connecting said motive means to said first and second groups of louvers so as to move one group of louvers toward an open position with the airstream flowing therethrough converging with the airstream flowing through the other group of louvers and while moving the other group of louvers toward a closed position and vice versa, and means responsive to movement of either group of louvers toward and into closed position for exerting an opposing force thereon for aiding in subsequently moving the respective group of louvers in the opposite direction against the force of an airstream impinging thereon.

13. A compact self-contained mixing valve adapted to be positioned within a housing of an air distributing system for mixing airstreams, said mixing valve including frame means defining a composite housing having substantially side-by-side first and second air passages therethrough, first and second groups of elongate louver blades pivotally mounted along one longitudinal edge portion in said composite housing on spaced parlel axes for pivotal movement in the respective first and second passages, said one longitudinal edge portion of each of said blades comprising an enlarged rounded portion and each of said blades also having a substantially free longitudinal edge portion remote from said one longitudinal edge portion, and the free longitudinal edge portions of certain of said louver blades having a curved lip formed therewith arranged to matingly engage adjacent blades along the pivotal axes thereof in conforming interfacial engagement with said enlarged rounded portion to provide an effective seal, motive means mounted on said frame means positioned to extend across and outwardly of the pivotal axes of said groups of louver blades, and means including an elongate longitudinally movable operating member also positioned to extend across and outwardly of the pivotal axes of said groups of louver blades for movement back and forth by said motive means and operatively connecting said motive means to said first and second groups of louvers so as to move one group of louvers toward an open position while moving the other group of louvers toward a closed position and vice versa, the louver blades of either group, when in closed position, being oriented such that the airstream impinging thereagainst serves to aid in maintaining the blades tightly sealed, and the louver blades of said groups, when both are in open positions, being oriented so as to direct the respective airstreams flowing therethrough into converging relation with one another.

14. A mixing valve adapted to be positioned in a housing of an air distributing system for mixing airstreams, said mixing valve including frame means defining a composite housing having substantially side-by-side first and second air passages therethrough, first and second groups of elongate louver blades pivotally mounted along one longitudinal edge portion in said composite housing on spaced parallel axes for pivotal movement in the respective first and second passages, motive means mounted on said frame means positioned to extend across and outwardly of the pivotal axes of said groups of louver blades, means including an elongate longitudinally movable operating member also positioned to extend across and outwardly of the pivotal axes of said groups of louver blades for movement back and forth by said motive means and operatively connecting said motive means to said first and second groups of louvers so as to move one group of louvers toward an open position with the airstream flowing therethrough converging with the airstream flowing through the other group of louvers and so as to move the other group of louvers toward a closed position and vice versa, and force applying means operatively connected to said operating member and being in a substantially inactive condition when said first and second groups of louver blades occupy predetermined intermediate positions about halfway between open and closed positions thereof with said operating member then occupying a neutral position, and said force applying means being responsive to movement of said operating member causing movement of either group of louver blades from its respective intermediate position toward and into closed position for exerting an opposing force on said operating member for aiding said motive means in subsequently opening the closed group of louver blades against the force of an airstream impinging thereon.

* * * * *